(12) United States Patent
Chao

(10) Patent No.: US 7,209,301 B2
(45) Date of Patent: Apr. 24, 2007

(54) OPTICAL LENS

(75) Inventor: Sheng-Jui Chao, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/393,294

(22) Filed: Mar. 30, 2006

(65) Prior Publication Data

US 2007/0008629 A1    Jan. 11, 2007

(30) Foreign Application Priority Data

Oct. 7, 2005   (TW) .............................. 94135181 A

(51) Int. Cl.
  G02B 7/02    (2006.01)
  G02B 13/18   (2006.01)
(52) U.S. Cl. .................. 359/811; 359/719; 425/808
(58) Field of Classification Search ................ 359/811, 359/719, 718, 820; 264/1.1, 328.9, 328.12, 264/2.1, 2.2, 2.3; 425/808, 573
See application file for complete search history.

(56) References Cited

U.S. PATENT DOCUMENTS 4,113,224 A * 9/1978 Clark et al. ................ 249/105
4,506,951 A * 3/1985 Yamada ...................... 359/820
6,144,500 A * 11/2000 Iwaki et al. ................ 359/719
2003/0026007 A1* 2/2003 Yamamoto et al. ......... 359/811
2004/0080837 A1* 4/2004 Yamamoto et al. ......... 359/811

* cited by examiner

Primary Examiner—Jordan Schwartz
Assistant Examiner—James C. Jones
(74) Attorney, Agent, or Firm—Thomas, Kayden, Horstemeyer & Risley

(57) ABSTRACT

Optical elements are provided. An optical element is formed by injecting resin material into a mold through a gate in a first direction. The optical element includes a main body, a flange surrounding and connecting the main body, and a curved depression formed between the main body and the flange. The main body has a central axis and a first curved surface. The flange includes an annular abutting surface and a connecting portion. The connecting portion has a connecting surface connecting the first curved surface and the abutting surface. Both of the abutting surface and the connecting surface are perpendicular to the central axis.

20 Claims, 4 Drawing Sheets

OPTICAL LENS

BACKGROUND

The invention relates in general to optical lenses, and in particular to optical lenses with high structural strength and high stability for injection molding.

Optical glass and optical plastic are two major materials used in optical lens fabrication. As optical plastic materials are cheap and easy to produce, they have been widely applied in various productions of optical lenses.

Referring to FIG. 1, a conventional plastic optical lens is formed by injection molding, and comprises a round main body M surrounded by a flange F. The main body M, such as an aspherical optical lens, refracts light to alter the optical path. The flange F sustains and connects other optical lenses. An annular depression R is formed between the main body M and the flange F, symmetrical to a central axis C of the main body M.

As shown in FIG. 1, to produce a conventional plastic optical lens, plastic resin is injected into a mold (not shown) through a gate G along the first direction A1, wherein the width of the gate G is d1. As the plastic resin moves to a narrow region of width d2 (d2<d1) adjacent to the depression R, the resin can thicken and become sluggish and unstable, leading to possible surface imperfections and incomplete filling of the mold.

SUMMARY

Optical lenses are provided. The optical lens is formed by injecting resin material into a mold through a gate in a first direction. The optical lens includes a main body, a flange surrounding and connecting the main body, and a curved depression formed between the main body and the flange. The main body has a central axis and a first curved surface. The flange includes an annular abutting surface and a connecting portion. The connecting portion has a connecting surface connecting the first curved surface and the abutting surface. Both of the abutting surface and the connecting surface are perpendicular to the central axis.

DETAILED DESCRIPTION

Figure 1:
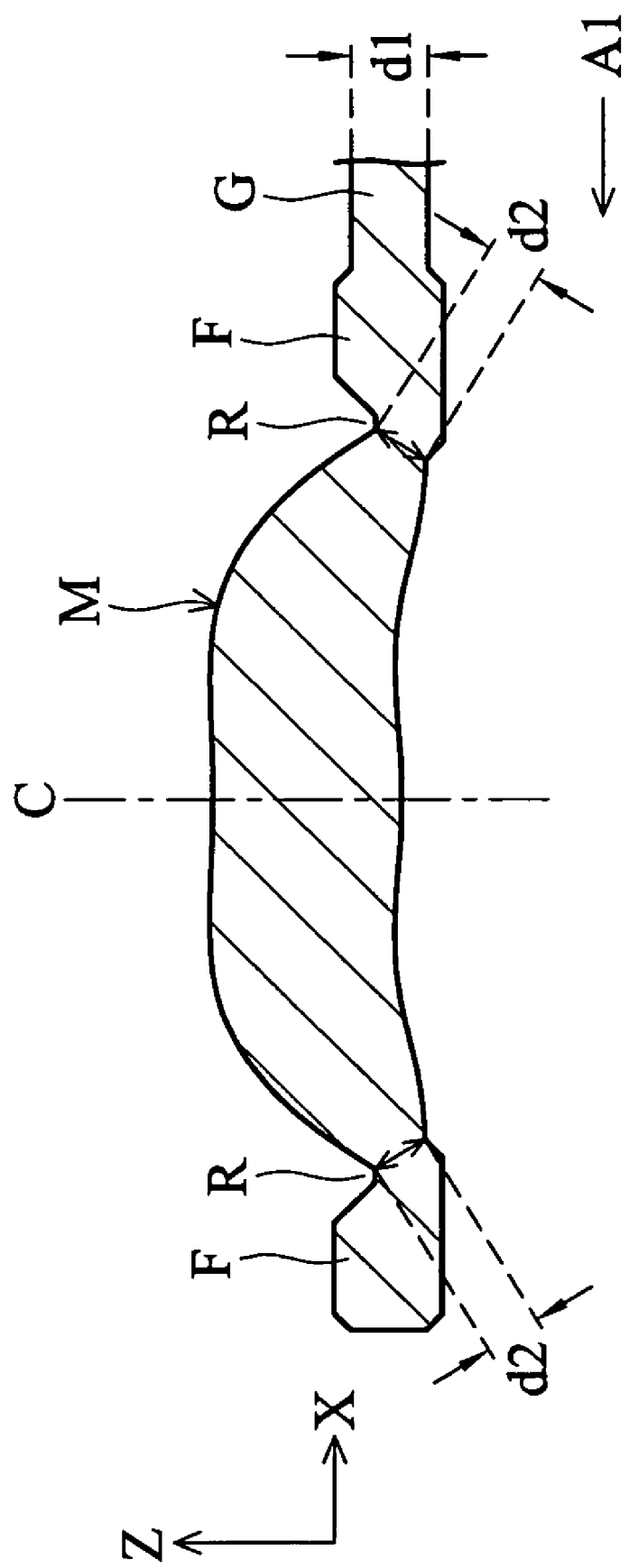
FIG. 1 is a perspective diagram of a conventional optical lens.
Figure 2:
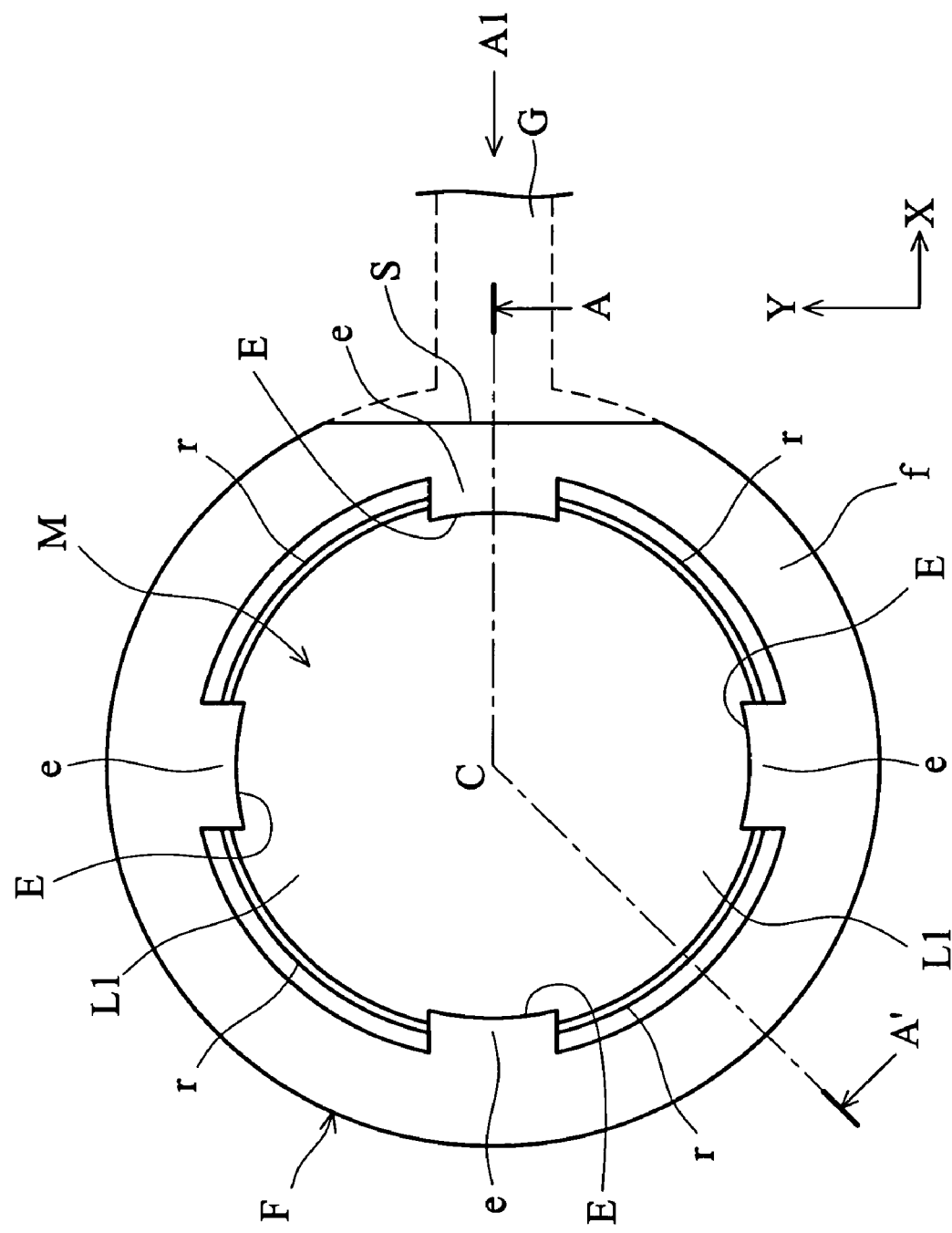
FIG. 2 is a top view of an embodiment of an optical lens.
Figure 3:
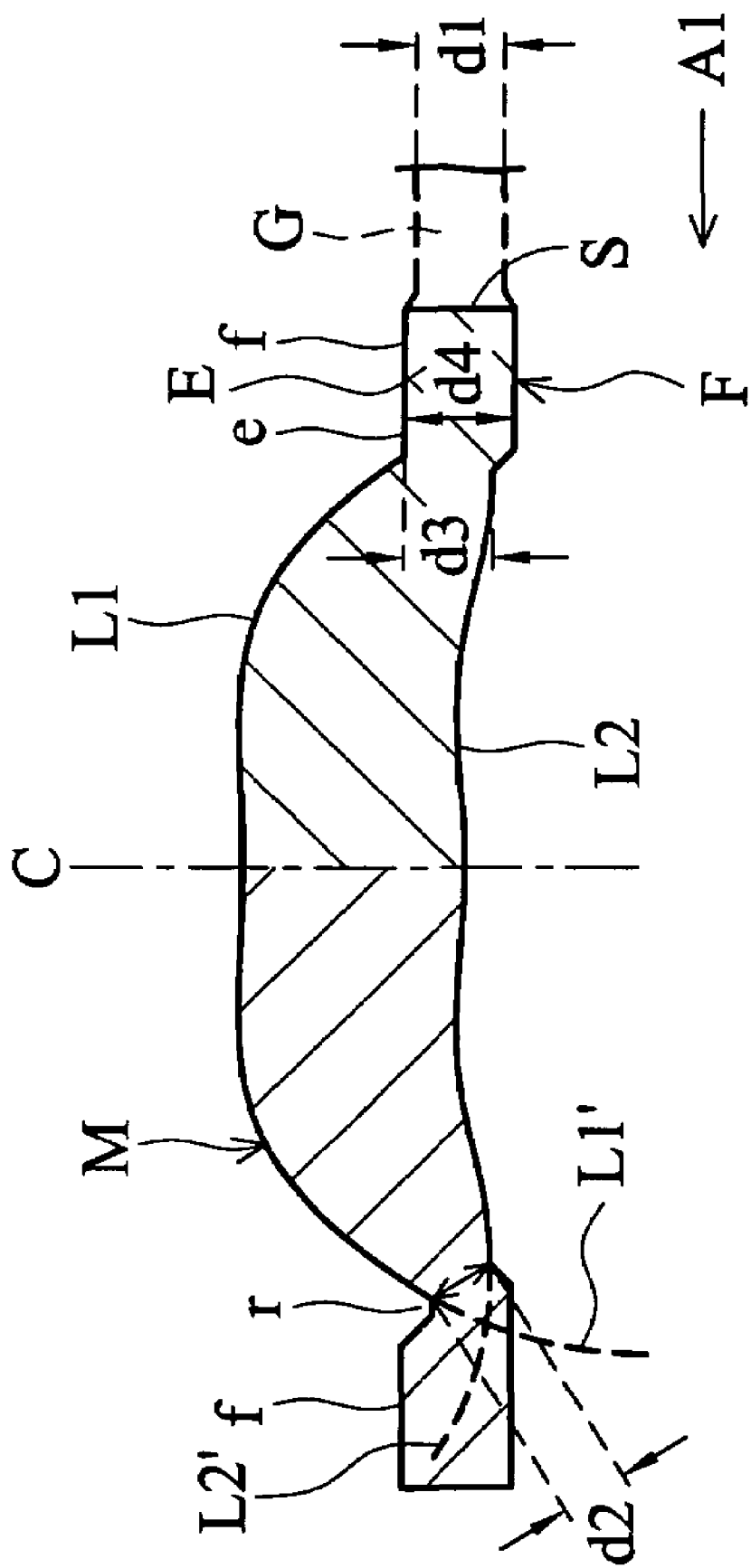
FIG. 3 is a sectional view of A-C-A' in FIG. 2.
Figure 4:
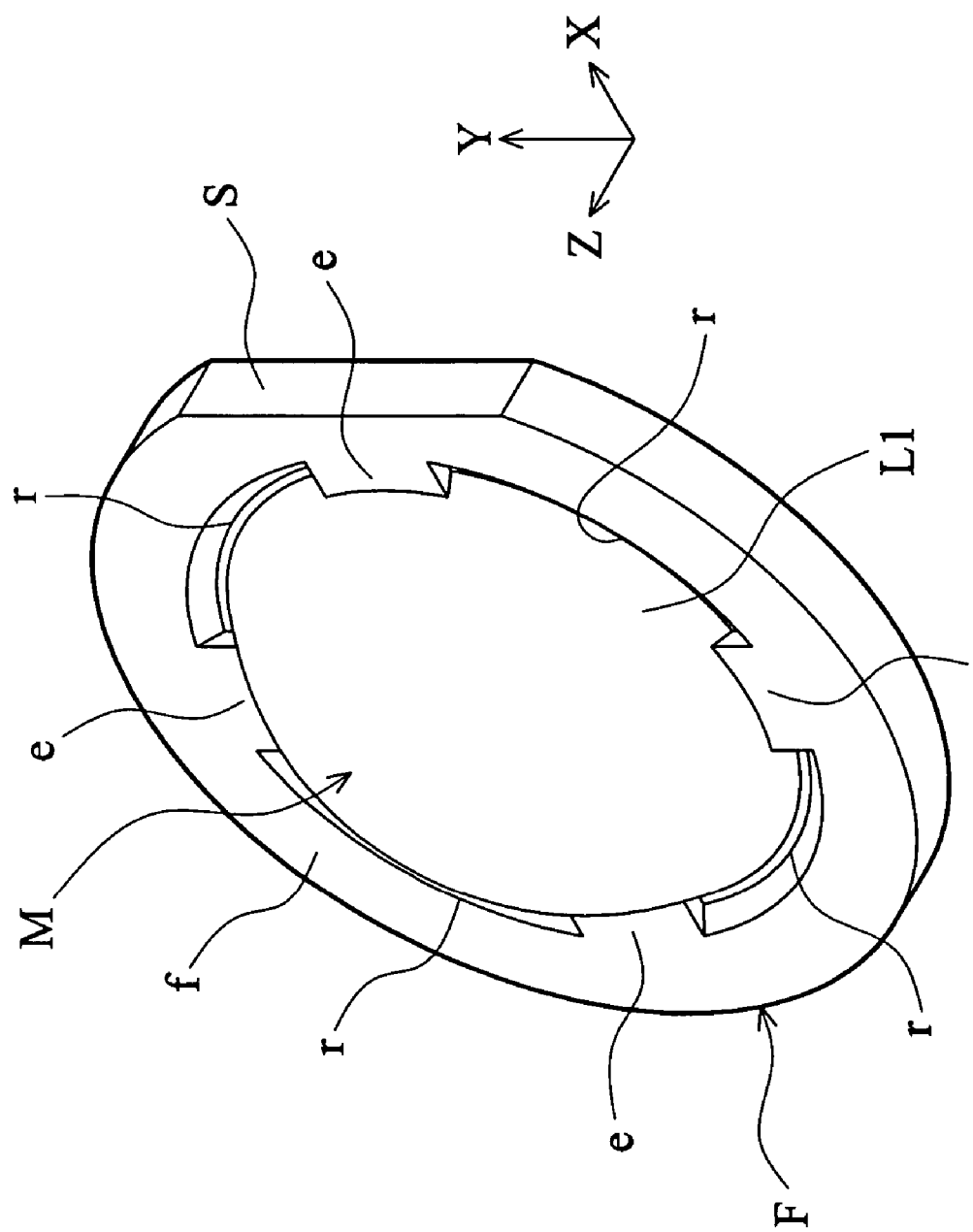
FIG. 4 is a perspective diagram of an embodiment of an optical lens.

Referring to FIGS. 2–4, an embodiment of a plastic optical lens is formed by injection molding, and comprises a round main body M and a flange F connecting and surrounding the main body M. As shown in FIGS. 2 and 3, several recesses r are formed between the flange F and the main body M. The narrow region near the recesses r has a thickness of d2, as shown in the right side of FIG. 3.

In this embodiment, the flange F has an annular abutting surface f substantially perpendicular to a central axis C of the main body M, to sustain and connect other optical lenses. Moreover, a cut surface S perpendicular to the first direction A1 is formed on a side of the flange F after injection molding.

The main body M, such as an optical lens, comprises a first curved surface L1 and a second curved surface L2. In this embodiment, the main body M is provided as an aspherical lens, wherein both the first and second curved surfaces L1 and L2 are aspherical. As the dashed lines indicate in the left side of FIG. 3, extended portions of the first and second curved surfaces L1 and L2 intersect outside the main body M. In some embodiments, effective optical diameter of the first curved surface L1 extends beyond the second curved surface L2.

To produce the plastic optical lens, plastic resin is injected into a mold (not shown) through a gate G of width d1 along the first direction A1, as shown in FIGS. 2 and 3. Specifically, four connecting portions F are provided to increase the thickness of the narrow region between the main body M and the flange F, improving stability during injection molding.

As shown in FIG. 2, the connecting portions F and the recesses r are symmetrically disposed around the central axis C, wherein each of the curved recesses r is formed by the main body M, the flange F and two of the connecting portions F. In FIG. 3, each of the connecting portions E comprises a connecting surface e connecting the abutting surfaces f and the first curved surface L1. In this embodiment, the connecting surfaces e and the abutting surfaces f are coplanar and substantially perpendicular to the central axis C.

According to the embodiment, the thickness of the narrow region between the main body M and the flange F is increased from d2 to d3 (d3>d2) by the connecting portions E. Thus, surface imperfections and incomplete filling of mold are reduced, improving structural strength and stability during injection molding. As shown in FIG. 3, in some embodiments, the flange F has a maximum thickness d4, wherein d4>d1 and d4≧d3, and the thickness d3 can be appropriately configured such that d3>d1 or d3<d1.

One or more connecting portions E can be provided for connection of the abutting surfaces f and the first curved surface L1. In some embodiments, only one connecting portion E is provided corresponding to the gate G to connect the abutting surfaces f and the first curved surface L1 along the first direction A1, as the connecting portion E close to the gate G shown at the right side of FIG. 2, thereby improving stability during injection molding.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical lens formed by injecting material into a mold through a gate along a first direction, comprising:
   a main body, comprising a central axis and a first curved surface;
   a flange, connecting and surrounding the main body, the flange comprising an annular abutting surface and a connecting portion, the connecting portion comprising a connecting surface connecting the abutting surface and the first curved surface, wherein the connecting surface and the abutting surface are both perpendicular to the central axis;
   a curved recess, formed by the main body, the flange and the connecting portion; and at least a portion of the curved recess connecting the annular abutting surface to the first curved surface without utilizing the connecting portion.

2. The optical lens as claimed in claim 1, wherein the connecting portion substantially extends in the first direction to connect the abutting surface and the first curved surface.

3. The optical lens as claimed in claim 2, wherein the connecting portion is close to the gate.

4. The optical lens as claimed in claim 1, wherein the optical lens comprises a plurality of curved recesses, and the flange comprises a plurality of connecting portions, each of the curved recesses formed by the main body, the flange and two of the connecting portions.

5. The optical lens as claimed in claim 4, wherein the optical lens comprises four curved recesses symmetrical to the central axis, and the flange comprises four connecting portions symmetrical to the central axis.

6. The optical lens as claimed in claim 1, wherein the flange further comprises a cut surface perpendicular to the first direction.

7. The optical lens as claimed in claim 1, wherein the main body further comprises a second curved surface opposite to the first curved surface, and extended portions of the first and second curved surfaces intersect outside of the main body.

8. The optical lens as claimed in claim 7, wherein the first curved surface is an aspherical surface.

9. The optical lens as claimed in claim 8, wherein the second curved surface is an aspherical surface.

10. The optical lens as claimed in claim 7, wherein effective optical diameter of the first curved surface extends beyond the second curved surface.

11. An optical lens formed by injecting plastic resin into a mold through a gate along a first direction, comprising:
a main body, comprising a central axis and a first curved surface;
a flange, connecting and surrounding the main body, the flange comprising a annular abutting surface and a connecting portion, the connecting portion comprising a connecting surface connecting the abutting surface and the first curved surface, wherein the connecting surface and the abutting surface are coplanar;
a curved recess, formed by the main body, the flange and the connecting portion; and at least a portion of the curved recess connecting the annular abutting surface to the first curved surface without utilizing the connecting portion.

12. The optical lens as claimed in claim 11, wherein the connecting portion substantially extends in the first direction to connect the abutting surface and the first curved surface.

13. The optical lens as claimed in claim 12, wherein the connecting portion is close to the gate.

14. The optical lens as claimed in claim 11, wherein the optical lens comprises a plurality of curved recesses, and the flange comprises a plurality of connecting portions, each of the curved recesses formed by the main body, the flange and two of the connecting portions.

15. The optical lens as claimed in claim 14, wherein the optical lens comprises four curved recesses symmetrical to the central axis, and the flange comprises four connecting portions symmetrical to the central axis.

16. The optical lens as claimed in claim 11, wherein the flange further comprises a cut surface perpendicular to the first direction.

17. The optical lens as claimed in claim 11, wherein the main body further comprises a second curved surface opposite to the first curved surface, and extended portions of the first and second curved surfaces intersect outside of the main body.

18. The optical lens as claimed in claim 17, wherein the first curved surface is an aspherical surface.

19. The optical lens as claimed in claim 18, wherein the second curved surface is an aspherical surface.

20. The optical lens as claimed in claim 17, wherein effective optical diameter of the first curved surface extends beyond the second curved surface.

* * * * *